No. 675,360. Patented May 28, 1901.
L. O. STEVENS.
VEHICLE.
(Application filed June 6, 1899.)
(No Model.) 2 Sheets—Sheet I.
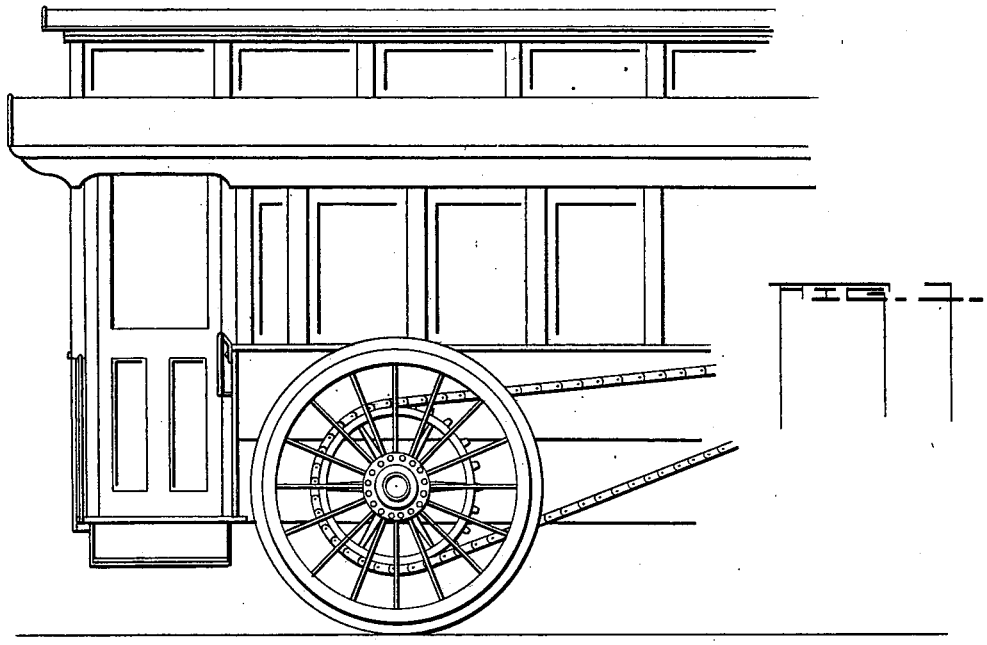
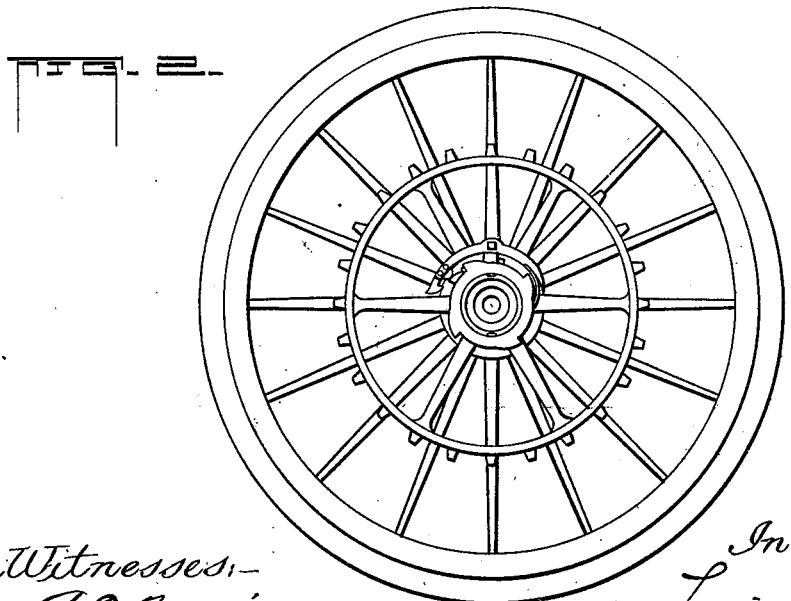
Witnesses:
A. E. Francis
J. T. Hunter.
Inventor:
Lucious O. Stevens
by Chas. H. LaPorte.
atty.

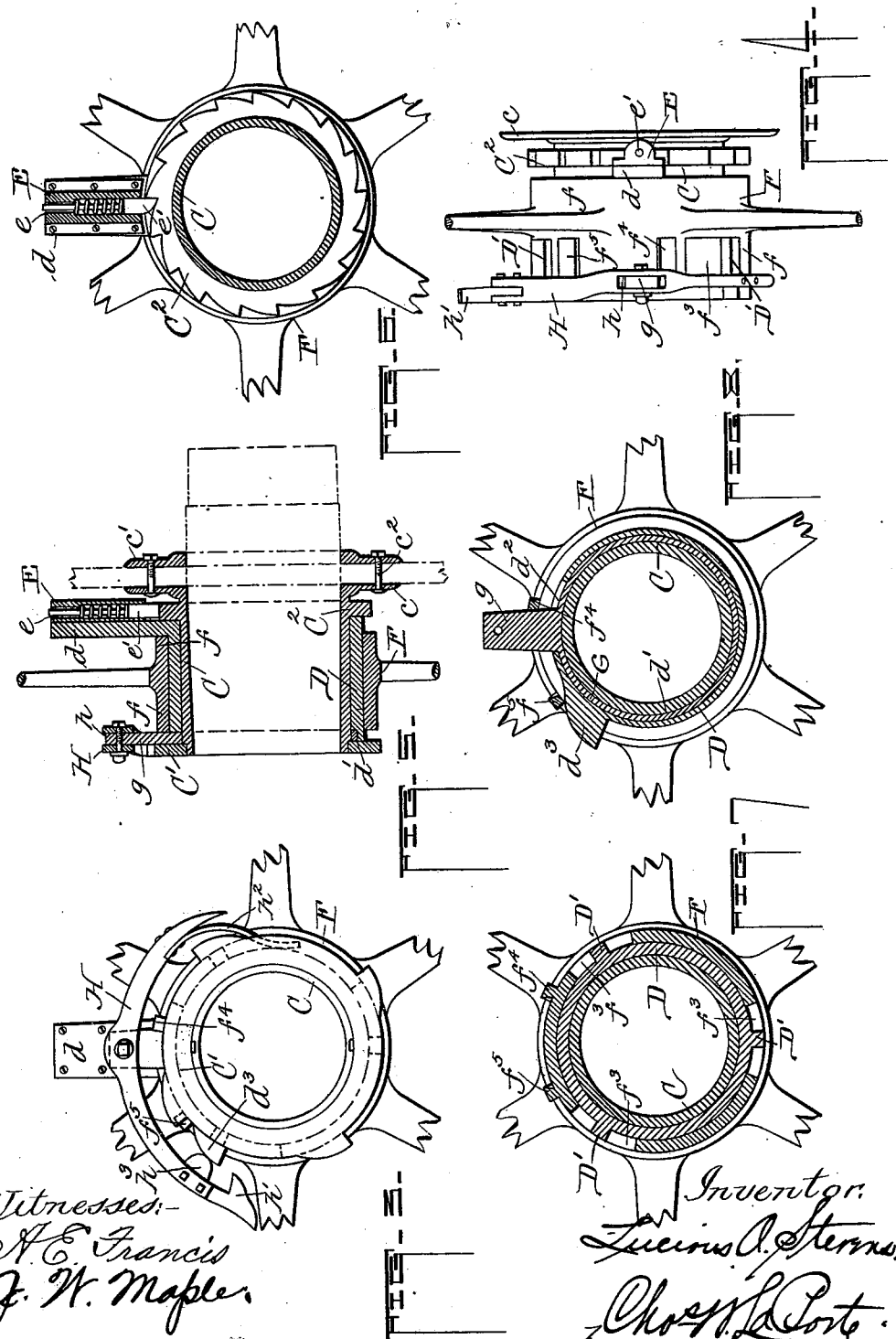

UNITED STATES PATENT OFFICE.

LUCIOUS O. STEVENS, OF PEORIA, ILLINOIS, ASSIGNOR TO JOHN C. BIRKET, OF SAME PLACE.

VEHICLE.

SPECIFICATION forming part of Letters Patent No. 675,360, dated May 28, 1901.

Application filed June 6, 1899. Serial No. 719,625. (No model.)

*To all whom it may concern:*

Be it known that I, LUCIOUS O. STEVENS, a citizen of the United States, residing at Peoria, in the county of Peoria and State of Illinois, have invented certain new and useful Improvements in Vehicles; and I do hereby declare that the following is a full, clear, and exact description of the invention, which will enable others skilled in the art to which it appertains to make and use the same.

My invention relates to certain new and useful improvements in vehicles, by means of which certain new and novel features are provided, being well adapted for the purpose designed.

More particularly my invention relates to an improvement in that class of vehicles known as "horseless" vehicles to provide suitable mechanism which may be readily applied to four-wheeled vehicles as they may be constructed and are in use for transmitting power from any preferred motor to the rear wheel of the vehicle for propelling the same either forwardly or rearwardly and for automatically disengaging said propelling mechanism, enabling the wheel describing the greatest arc of the circle to accommodate its speed to the increased distance to be traversed in turning while the mechanism on the wheel upon the opposite side of the vehicle, which travels upon a lesser arc of a circle, is actuated, giving momentum to said vehicle. I attain these objects by the means illustrated in the accompanying drawings, forming a part of this specification, in which—

Figure 1 is an elevation of a portion of a vehicle with my improvement attached to the wheel thereof. Fig. 2 is an elevation of a wheel removed from the vehicle and of the mechanism employed and embodying the improvements of this invention shown attached to the hub thereof. Figs. 3, 4, 5, 6, 7, and 8 are enlarged detail views of my improvements in elevation, plan, horizontal, and vertical section.

Like letters of reference refer to similar parts throughout the several views.

In the drawings (referring to Fig. 1) I have shown in elevation a portion of a vehicle and designated as A, having wheels B, and showing my improvements attached thereto and the relation they bear to said vehicle and wheel. I do not wish to limit myself to any form or style of vehicle, as any desired form of construction may be used to advantage.

C is a collar adapted to be carried on the inner hubs of the rear wheels B, and $c$ is a ring extending out from said collar, purposed to be carried adjacent to the spokes of the wheel B, and $c'$ is a ring carried on the outer hubs of the wheel B and adjacent to the spokes, to which the ring $c$ is bolted by means of the bolts $c^2$, carried between the spokes of said wheel. The means of retaining the collar on the hub is very simple and durable, but the same may be keyed or otherwise secured thereto.

$C'$ is a ratchet-wheel on the inner end of the collar C, and $C^2$ is a ratchet-wheel carried on the collar C, near the outer end thereof or just back of the ring $c$.

D is a sleeve carried on the collar C and is provided at its rear end with the lateral projection or plate extension $d$. $D'$ represents lug projections extending out from the face of said sleeve in the manner shown, the purpose of which will be hereinafter more fully described.

E is a bracket, shown secured to the plate $d$ and having the centrally-disposed aperture $e$, in which is carried a spring-compressed pawl $e'$, engaging with the teeth of the ratchet-wheel $C^2$ on the collar C, which is carried adjacent to the plate $d$.

F is a sprocket-wheel having the hub extensions $f$ and is adapted to be actuated through the sprocket-chain connection $f^2$, which is actuated through suitable sprocket-wheel connection from a suitable motive agent at the forward end of the vehicle. The hub is adapted to be carried on the sleeve D and is purposed to oscillate thereon. $f^3$ represents slots suitably disposed in said hubs and are circumferentially arranged around a portion thereof, as shown, the same being arranged in such a manner as to have carried therein the lug projections $D'$, above described as extending out from the face of the sleeve D, the same being adapted to contact with the ends of the slots when the sprocket-wheel oscillates in either a forwardly or rearwardly direction. The sleeve D, at its inner end, is grooved circumferentially, as at $d'$, and has the open-slotted way $d^2$, extending around a portion of the face thereof.

G is a ring adapted to be carried in the groove $d'$ and adjacent to the outer wall of the collar C and the ratchet-wheel C'.

$g$ is a plate extension from the ring G and projects outwardly therefrom, passing through the slotted way $d^2$ in the sleeve D, and is limited in its movement by contact with the ends thereof.

H is a semicircular engaging dog having the slot $h$, through which the upper end of the plate extension $g$ protrudes and to which it is secured by a suitable bolt or pin, and $h'$ is an engaging tooth or lug provided on one end thereof, the opposite end being held under compression by means of the spring $h^2$, which bears against the peripheral face of the sleeve D and in a groove formed by the ratchet C' and the hub of the sprocket-wheel.

As the mechanism to which reference is made performs three distinct functions—that of propelling the vehicle in a forwardly and rearwardly direction and to also adapt the wheel making the long radius when turning to accommodate its speed to the increased distance to be traversed or to be equally or unequally revolved, as may be required, when running on straight or curved roads—it would perhaps be better at this time to describe the operation of the parts when it is desired to give the wagon a forward momentum. Power having been applied thereto, it being understood from an examination of the figures that the parts have assumed such a position as to cause the wagon to move forward, the ends of the slots $f^3$ in the hub of the sprocket-wheel F will bear against the lugs D', projecting out from and carried by the sleeve D, which said movement will also cause the lug $f^4$, carried on the hub of the sprocket, to engage with the plate extension $g$ from the ring G, resulting in a shifting of the semicircular dog H, which will cause the end carrying the lug $h'$ to be raised by reason of the lug $h^3$, depending from the main body H, engaging with and riding on the lug $d^3$, carried by the sleeve D, and by reason of the pawl $e'$ engaging with the teeth of the ratchet-wheel $C^2$ on the collar C it will be seen that with the pressure exerted by the pawl $e'$ through the movement of the sprocket-wheel and the sleeve D the wagon will be caused to be moved forward. The parts having assumed a position to cause the vehicle to be propelled forward, substantially the same assembling of parts will enable the wheel that has to describe the greatest arc of the circle to rotate with increased speed, and although the parts which act conjointly with the sprocket-wheel when the vehicle is moving forward will when the vehicle is turning automatically disengage itself from the sprocket, or, in other words, release the same and allow the wheel making the long radius to increase its speed, while the other of said wheels acts as the propeller through the sprocket-wheel which imparts motion thereto and which turns upon a lesser arc of a circle, and the operation of the parts is as follows: It being understood that the sprockets will travel at an equal rate of speed, which said movement will continue even though the vehicle be going forward or making a turn, the wheel having to describe the greatest arc of the circle will travel at a speed greater than that of the sprocket carried thereon, which receives its momentum from suitable motive power carried on the vehicle, caused by the adjustment of the collar C, sleeve D, and sprocket F being such that there is nothing to retard the same, owing to the collar, which is fast to the hub of the drive-wheel, being able to rotate in a forward direction, caused by the arrangement of the ratchet $C^2$ on the rear thereof being such as to enable the same to release itself from the spring-compressed pawl $e'$, and through the adjustment of the sleeve D, carrying the lug $d^3$, which engages with the lug $h^3$, resulting in raising the toothed projection or lug $h'$, which is in a plane above the teeth of the ratchet-wheel C', sufficiently to enable the ratchet-teeth of the ratchet-wheel C' to pass beneath the same. The moment the wagon again assumes a direct line the power will again be direct and the movement of the parts just described will be substantially the same.

Having described the movement of parts causing the vehicle to move forwardly and how the parts will operate when turning, the third step in the operation is to describe the automatic shifting of parts when the operator desires to propel the vehicle rearwardly. The power being reversed, the sprocket-wheel F will oscillate on the sleeve D, and the lug $f^5$, carried on the hub thereof, which is similar to the lug $f^4$, will engage with the plate extension $g$, causing the ring G to be shifted, resulting in a shifting of the dog H, releasing the lug $h^3$ or causing the same to slip from off the lug projection $d^3$, carried by the sleeve D, enabling the lug $h'$ to engage with the proper tooth from the ratchet-wheel C', which is fast to the collar C. The reversing of the sprocket-wheel F will cause the end of the slots $f^3$ therein to also bear against the lugs D', and this, in combination with the pressure applied by the end of the open-slotted way $d^2$ in the sleeve on the lug $g$, holding the same in position, causing a firm engagement of the lug $h'$ with the proper tooth of the ratchet C', will cause a corresponding movement of the vehicle as that first above described, but in an opposite or rearwardly direction.

By my above-described improvements a propelling and radius turning mechanism may be provided ready to be applied to any type of vehicle now in use without requiring any material alteration or changes in the same for transmitting motion to the rear wheels of the same, being actuated by any suitable motor. The device is simple and durable and when power is applied to the sprocket will operate automatically in going forward or when reversed to move rearwardly and is capable of causing the wheels to be equally or unequally revolved, as may be required when running on straight or curved roads.

In practice my device has been found equally applicable to that class of vehicles on which is mounted and adapted to be actuated from the rear wheels a broadcast seeder. The drawback in the successful operation of a broadcast seeder is found in the sprocket on the inner rear hubs of the vehicle carrying and operating it. The sprocket referred to actuates a sprocket through suitable chain connection carried on a shaft having suitable bevel-gear connection with the distributer of the seeder, and by reason of the constant strain on the sprocket and sprocket-chain and the effort of the rear wheel, which has to travel the long radius, to accommodate its speed to the increased distance to be traversed in turning, if no provision is made to release the sprocket, either the sprocket or chain under the heavy strain will break. By applying my device in the manner hereinbefore described it will be readily seen that the sprocket will be released when turning and when the vehicle again assumes a direct line will cause the seeder to be operated, thus saving the wear and tear on chain and sprocket and the increased cost, which is a final result if the sprocket or chain breaks.

Having thus fully described my invention, what I claim, and desire to secure by Letters Patent, is—

1. A compensating mechanism, comprising a tubular member fixed to the ground-wheels of a vehicle, ratchet mechanism arranged at opposite sides thereof, a sleeve carried by said member having means fixed thereto for engaging with one series of ratchets of the tubular member, for the purpose described.

2. A compensating mechanism, comprising a tubular member having a fixed relation with ground-wheels of a vehicle, a sleeve carried by said member and arranged with means for engaging ratchet-teeth of the member, a propelling member having extended hub portions, the same arranged to have an oscillatory movement on the sleeve, a means for imparting movement to the tubular member through mechanism arranged to be intermittingly engaged by the propelling member, substantially in the manner specified.

3. A compensating mechanism, comprising a tubular member having a fixed relation with ground-wheels of a vehicle, a sleeve carried by said member and arranged with means for engaging ratchet-teeth of the member, a propelling member having extended hub portions, the same arranged to have an oscillatory movement on the sleeve, slotted portions of said hub, lugs or projections from the sleeve acting in said slotted portions and the means for causing an alternate forward or backward movement of the tubular member, substantially as described.

4. In a propelling and radius turning mechanism for transmitting motion to the rear wheels of a vehicle, and to enable the wheel making the long radius to accommodate its speed to the increased distance to be traversed in turning, a collar fast to the respective inner hubs of said wheels, ratchet-wheels on the inner and outer ends of said collar, and adapted to turn therewith, a sleeve loosely mounted on said collar and provided with a plate projection carrying suitable spring-compressed pawl engaging with the teeth of the outer ratchet-wheel on said collar, of a ring carried in a circumferential groove in said sleeve and adjacent to the inner ratchet on said collar, the same being provided with a plate extension carrying suitable dog or lug adapted to intermittingly engage the teeth of the inner ratchet-wheel, a sprocket-wheel mounted on said sleeve and adapted to oscillate thereon, suitable slots arranged in the hub of said sprocket, the ends of which are adapted to engage suitable lugs protruding therethrough and carried by said sleeve, adapted when the sprocket is actuated to in turn impart motion to said vehicle-wheels, all substantially as and for the purpose set forth.

5. A compensating mechanism, comprising a tubular member fixed to the ground-wheels of a vehicle, ratchet mechanism arranged at opposite sides thereof, a sleeve carried by said member having means fixed thereto for engaging with one series of ratchets of the tubular member, a circumferentially-arranged groove in the sleeve, an oscillating ring carried therein provided with a lug or plate extension protruding through an open-slotted way in the sleeve, and means carried thereby for engaging the ratchets on the opposite side of the tubular member, all arranged substantially as described.

6. A compensating mechanism, comprising a tubular member having a fixed relation with ground-wheels of a vehicle, a sleeve carried by said member and arranged with means for engaging ratchet-teeth of the member, a propelling member having extended hub portions, the same arranged to have an oscillatory movement on the sleeve, slotted portions in the hub of said propelling member, lugs or projections from the sleeve acting in said slotted portions, a circumferentially-arranged groove in the sleeve at one side, an oscillating ring carried therein and protruding means from the ring-carrying engaging mechanism to engage a supplemental ratchet of the tubular member, all arranged substantially for the purpose described.

7. A compensating mechanism, comprising a tubular member fixed to the ground-wheels of a vehicle, ratchet mechanism arranged at opposite sides thereof, a sleeve carried by said member having means fixed thereto for engaging with one series of ratchets of the tubular member, a circumferentially-arranged groove in the sleeve, an oscillating ring carried therein provided with a lug or plate extension protruding through an open-slotted way in the sleeve, of a semicircular engaging dog suitably pivoted to the lug or plate extension of the oscillating ring having an engaging tooth or lug arranged to engage the inner series of ratchets of the tubular member the opposite end of said engaging dog held under spring compression, and propelling mechanism for imparting an alternate forward and rearward movement to the tubular member, substantially as described.

8. In mechanism for propelling the rear wheels of a vehicle in a forwardly and rearwardly direction, a collar fast to the hubs of said wheels and carrying ratchet-wheels on the opposite ends thereof, a sleeve loose on said collar and grooved circumferentially at the inner end thereof, of a ring carried in said groove and provided with a plate extension therefrom, carrying a semicircular dog adapted to intermittingly engage the inner ratchet on said collar, a sprocket-wheel oscillating on said sleeve, of the means carried on said hubs engaging suitable mechanism on the sleeve and collar purposed to impart momentum to said vehicle-wheels when power is applied to said sprockets, all substantially in the manner and for the purpose set forth.

9. In mechanism for propelling the rear wheels of a vehicle in a forwardly and rearwardly direction, the collar C, carrying ratchets C', and C², sleeve D, with the plate extension $d$, carrying the pawl $e'$, engaging with ratchet-wheel C², of the ring G, carried in a circumferentially-arranged groove in the sleeve D, and having plate extension $g$, the semicircular engaging spring-compressed dog H, carried by the ring G, on the plate $g$, and adapted to intermittingly engage the ratchet-wheel C', of the sprocket F, oscillating on said sleeve and adapted to impart motion to said vehicle-wheel through the collar C, when power is applied thereto, in the manner and for the purpose described.

10. The mechanism for imparting an alternate forward and rearward movement to a vehicle and to compensate for the turn of such vehicle, comprising a member fixed to the propelling-wheels, loosely-carried means on said member having matching engaging means with ratchet-teeth on one end of said fixed member, oscillating mechanism at the opposite end of said member carrying intermittingly-engaging means with a ratchet on the matching end of the tubular member, a sprocket-wheel arranged to have an oscillating movement on the loosely-carried means of the fixed member, and mechanism arranged to be actuated by the sprocket to impart through the loosely-carried means an alternate rearward or forward movement to the fixed member which will impart a corresponding movement to the vehicle and means for disengaging the ratchet-engaging means when the vehicle is turning, substantially as described.

11. The mechanism herein described for imparting a forward movement to a vehicle, comprising the member C, the sleeve D, the oscillating sprocket F, having an extended hub provided with suitable slotted portions, lugs D', of the sleeve engaging said slots, the lug $f^4$, the lug $h'$, carried by a suitable dog, the ratchet C', the pawl $e'$, and the ratchet C², the forward rotary movement of the sprocket causing the lug $f^4$, to raise the lug $h'$ from the ratchet C', whereby the pawl $e'$, will by such movement impart a corresponding movement to the vehicle, through the ratchet C², and the member C, substantially as described.

In testimony whereof I affix my signature in presence of two witnesses.

LUCIOUS O. STEVENS.

Witnesses:
CHAS. W. LA PORTE,
A. JACOBSON.